United States Patent
Gether et al.

(10) Patent No.: US 11,706,273 B2
(45) Date of Patent: Jul. 18, 2023

(54) HOST COMMUNICATION CIRCUIT, CLIENT COMMUNICATION CIRCUIT, COMMUNICATION SYSTEM, SOUND REPRODUCING DEVICE AND COMMUNICATION METHOD

(71) Applicant: ams AG, Premstätten (AT)

(72) Inventors: Horst Gether, Premstaetten (AT); Stefan Bernhard, Premstaetten (AT); Michael Boehm, Premstaetten (AT)

(73) Assignee: AMS AG, Premstätten (AT)

( * ) Notice: Subject to any disclaimer, the term of this patent is extended or adjusted under 35 U.S.C. 154(b) by 128 days.

(21) Appl. No.: 17/432,293

(22) PCT Filed: Feb. 20, 2020

(86) PCT No.: PCT/EP2020/054512
§ 371 (c)(1),
(2) Date: Aug. 19, 2021

(87) PCT Pub. No.: WO2020/173807
PCT Pub. Date: Sep. 3, 2020

(65) Prior Publication Data
US 2022/0131916 A1 Apr. 28, 2022

(30) Foreign Application Priority Data

Feb. 25, 2019 (EP) .................................. 19159161
Apr. 15, 2019 (EP) .................................. 19169262

(51) Int. Cl.
*H04L 65/61* (2022.01)
*H04L 7/00* (2006.01)
*H04L 65/1069* (2022.01)

(52) U.S. Cl.
CPC ............ *H04L 65/61* (2022.05); *H04L 7/0008* (2013.01); *H04L 65/1069* (2013.01)

(58) Field of Classification Search
CPC ...... H04L 65/61; H04L 65/1069; H04L 7/008; H04L 7/04; G06F 11/004
(Continued)

(56) References Cited

U.S. PATENT DOCUMENTS

| | | | |
|---|---|---|---|
| 9,710,419 B2 * | 7/2017 | Hug | G06F 1/12 |
| 2009/0116475 A1 * | 5/2009 | Krzyzanowski | G06F 15/16 |
| | | | 370/352 |
| 2015/0280904 A1 * | 10/2015 | Tang | H04J 3/0652 |
| | | | 714/775 |

FOREIGN PATENT DOCUMENTS

TW 201710894 A * 3/2017 .......... G06F 11/1048

OTHER PUBLICATIONS

European Extended Search Report in corresponding EP Application No. 19169262.3 dated Aug. 13, 2019, 7 pages.
(Continued)

*Primary Examiner* — Glenford J Madamba
(74) *Attorney, Agent, or Firm* — MH2 Technology Law Group LLP

(57) ABSTRACT

A host side is adapted to be connected to a client side by means of a clock wire, a selection wire, a first data wire and a second data wire. The host side is configured to transmit a digital selection signal over the selection wire to the client side, the selection signal determining either an audio transmission mode or a client communication mode. Further, the host side is configured to transmit digital audio data of a first channel and a second channel over the first and the second data wire to the client side in the audio transmission mode, and to perform client communication over the first and the second data wire in the client communication mode.

15 Claims, 9 Drawing Sheets

(58) Field of Classification Search
USPC .......................................................... 709/217
See application file for complete search history.

(56) References Cited

OTHER PUBLICATIONS

Anonymous, "I2S bus specification", Philips Semiconductors, Feb. 1986, 7 pages.
International Search Report and Written Opinion in corresponding International Application No. PCT/EP2020/054512 dated Apr. 2, 2020, 10 pages.

* cited by examiner

HOST COMMUNICATION CIRCUIT, CLIENT COMMUNICATION CIRCUIT, COMMUNICATION SYSTEM, SOUND REPRODUCING DEVICE AND COMMUNICATION METHOD

CROSS-REFERENCE TO RELATED APPLICATIONS

The present application is the national stage entry of International Patent Application No. PCT/EP2020/054512, filed on Feb. 20, 2020, and published as WO 2020/173807 A1 on Sep. 3, 2020, which claims the benefit of priority of European Patent Application Nos. 19159161.9, filed on Feb. 25, 2019, and 19169262.3, filed on Apr. 15, 2019, all of which are incorporated by reference herein in their entirety.

FIELD OF THE INVENTION

The present disclosure relates to a host communication circuit, a client communication circuit, a communication system with such a host communication circuit and such a client communication circuit, to a sound reproducing device with such communication system, and to a method for communication between a host side and a client side.

BACKGROUND OF THE INVENTION

It is sometimes necessary to provide different circuit parts on different dies or in different chips. If data is to be transmitted between these circuit parts, a communication protocol is needed. For example, for transmitting audio data, the I2S protocol is well-established for transmitting audio data over a single data wire from a transmitter to a receiver, thereby also employing one wire for a clock signal and one wire for a word select signal. However, only audio data are transmitted with this protocol. Furthermore, only a unidirectional communication is possible.

If other data have to be transmitted from the transmitter to the receiver or even in the other direction, further communication interfaces have to be provided on the transmitter side and the receiver side. These require additional signal wires. Furthermore, two different communication protocols have to be implemented on both dies or both chips.

An object to be achieved is to provide an efficient communication concept for audio data transmission and a bidirectional communication over a limited number of signal wires.

This object is achieved with the subject matter of the independent claims. Embodiments and developments of the communication concept are defined in the dependent claims.

SUMMARY OF THE INVENTION

The efficient communication concept is based on the idea that two data wires can be provided for a communication between a host and a client that are able to both carry stereo audio data in parallel from the host to the client and to establish a communication between the host and the client on the same two data wires. This, for example, allows transmitting the audio data of a first and a second channel in parallel, such that no delay in transmission exists between, e.g., left and right audio channel. This may be desirable, for example, in noise cancellation applications.

For establishing the communication between the host and the client, a selection wire for transmitting a digital selection signal is foreseen, wherein the selection signal determines either an audio transmission mode or a client communication mode, or in other words, determines whether audio data are transmitted from the host to the client or client communication is performed between the host and the client.

In the client communication mode, a direction indicator can be transmitted from the host to the client in order to define whether data are to be sent from the host side to the client side or vice versa. For example, index data and, optionally, the direction indicator are transmitted over the first data wire, for example within a respective bit sequence, and payload data are transmitted over the second data wire, e.g. encoded in a second bit sequence. In particular, transmission of the index data and the payload data takes place in parallel or concurrently. In order to establish a timing, both the host side and the client side may be connected with a clock wire for transmitting a common clock signal. For example, a clock signal is transmitted from the host side to the client side over the clock wire.

Hence, with only four wires, both the transmission of audio data without delays between two audio channels can be achieved, while a bidirectional communication between host and client is possible as well. Hence a communication system with a host communication circuit on the host side and a client communication circuit on the client side can be produced with less manufacturing effort. Furthermore it reduces any latency issues that, for example, arise when using the conventional I2S protocol for audio data transmission. The client communication over the two data wires, e.g. allows a simple device control of the client by the host.

If no direction indicator is transmitted, a direction of communication, either from host to client or from client to host may be preselected. For example, only unidirectional communication takes place in such configuration. However, the communication direction may be defined according to a predefined timing scheme or depending on other ways of communication.

For example, a transmission rate of the audio data is higher than an actual playback rate in order to have a continuous stream of the audio data available at the client side. The actual transmission rate depends for example on the ratio between an amount of audio data to be transmitted and an amount of data of the client communication performed. For example, the audio data are transmitted with some kind of time compression.

In an example implementation of a host communication circuit according to the efficient communication concept, the host communication circuit is adapted to be connected to a client communication circuit by means of a clock wire, a selection wire, a first data wire and a second data wire. The host communication circuit is configured to transmit a digital selection signal over the selection wire to the client communication circuit, wherein the selection signal determines either an audio transmission mode or a client communication mode. The host communication circuit is further configured to transmit digital audio data of a first channel and a second channel over the first and the second data wire to the client communication circuit in the audio transmission mode, and to perform client communication over the first and the second data wire in the client communication mode.

In some implementations, the host communication circuit is further configured, when performing client communication in the client communication mode, to transmit a direction indicator. The host communication circuit is further configured to transmit a first bit sequence over the first data wire to the client communication circuit, wherein, in the audio transmission mode, the first bit sequence comprises the audio data of the first channel, e.g. a left audio channel, and when performing client communication, the first bit sequence comprises index data. The host communication circuit is configured, in the audio transmission mode, to transmit a second bit sequence over the second data wire to the client communication circuit, wherein the second bit sequence comprises the audio data of the second channel, e.g. a right audio channel.

The host communication circuit is further configured, when performing client communication, if the direction indicator is associated with a write mode, to transmit a second bit sequence over the second data wire to the client communication circuit, wherein the second bit sequence comprises payload data. If the direction indicator is associated with a read mode when performing client communication, the host communication circuit receives a second bit sequence over the second data wire from the client communication circuit, the second bit sequence comprising payload data. There may be a delay between transmitting of the index data in the read mode and the reception of the payload data.

In some implementations, when performing client communication, the first bit sequence further comprises the direction indicator. However, the direction indicator can be omitted in some applications, such that the write mode respectively read mode is predefined or set via a different communication channel.

In some implementations, in the client communication mode, the first bit sequence may comprise the index data, the direction indicator and an access indicator. The state of the access indicator determines whether the first and, if applicable, the second bit sequence are evaluated in the client communication circuit or on the client side. Hence, no evaluation has to take place on the client side, if e.g. no data are transmitted in the client communication mode, thus, saving power on the client side.

For example, in the client communication mode, the index data determine a target, e.g. a target address on the client side or in the client communication circuit in the write mode. Similarly, in the read mode, the index data may determine a source, e.g. a source address, in the client communication circuit or the client side. Such addresses may be memory addresses or register addresses. It is also possible that target and source determine functional elements or functional blocks on the client side, to which data are to be written or from which data are to be read or retrieved.

For example, the audio transmission mode and the client communication mode are determined by respective states or state changes of the selection signal.

For example, the audio transmission mode is indicated by changing the selection signal from a first state to a second state, and the client communication mode is indicated by changing the selection signal from the second state to the first state. For example, the selection signal can only take these two states.

The audio data of the first and the second channel may be transmitted concurrently or in parallel. Hence, no delay between the two channels is established.

In some implementations, the host communication circuit or the host side connect the first data wire and/or the second data wire to a high impedance connection if no bit information is to be transmitted, respectively. For example, the respective data wires are set to a floating state by the connection to the high impedance connection, i.e. no specific potential is forced onto the data wires.

In some situations it may be possible that no audio data have to be transmitted from the host side to the client side, while client communication should still take place, e.g. for controlling the client side. Still the mode of operation may be set to the audio transmission mode by the respective state or change of state of the selection signal. Hence, the host communication circuit is, for example, configured to, if no audio data are to be transmitted in the audio transmission mode, change a state of the selection signal to indicate the client communication mode after one clock cycle of the clock signal.

In such a configuration, one clock cycle would represent the smallest possible duration for the audio transmission mode. However, in other implementations, the state of the selection signal may be changed to indicate the client communication mode after a predetermined number of clock cycles of the clock signal, that number being smaller than a regular bit length of audio data to be transmitted. In both implementations, the throughput for the client communication is increased by decreasing the time of the audio transmission mode.

Controlling the client side may comprise activating and deactivating circuit parts on the client side like amplifiers, digital-to-analog converters, oscillators or the like.

An embodiment of a client communication circuit according to the efficient communication concept is adapted to be connected to a host communication circuit by means of a clock wire, a selection wire, a first data wire and a second data wire. For example, the host communication circuit is implemented according to one of the examples described above.

The client communication circuit receives the digital selection signal over the selection wire from the host communication circuit, the selection signal determining either an audio transmission mode or a client communication mode. The client communication circuit receives digital audio data of a first channel and a second channel over the first and the second data wire from the host communication circuit in the audio transmission mode, and performs client communication over the first and the second data wire in the client communication mode.

In some implementations, the client communication circuit is configured, when performing client communication in the client communication mode, to receive a direction indicator. The client communication circuit receives a first bit sequence over the first data wire from the host communication circuit. In the audio transmission mode, the first bit sequence comprises the audio data of the first channel, and, in the client communication mode, the first bit sequence comprises index data and, optionally, a direction indicator, e.g. as described above in conjunction with the host communication circuit. The direction indicator can be omitted in some applications, such that the write mode respectively read mode is predefined or set via a different communication channel.

Accordingly, in the audio transmission mode, the client communication circuit receives a second bit sequence over the second data wire comprising the audio data of the second channel.

When performing client communication, if the direction indicator is associated with a write mode, a second bit sequence is received over the second data wire from the host communication circuit, the second bit sequence comprising payload data. If the direction indicator is associated with a read mode, the client communication circuit transmits a second bit sequence over the second data wire to the host communication circuit, the second bit sequence comprising payload data. As indicated above, the index data may be received in a first cycle of the client communication mode to indicate a read address or a source in the client communication circuit, and the respective associated payload data are transmitted to the host communication circuit in a subsequent, second cycle of the client communication mode.

Further implementations of the client communication circuit become readily apparent to the skilled reader from the various implementations of the host communication circuit described above.

Implementations of the host communication circuit and the client communication circuit may together form a communication system which are connected by the clock wire, the selection wire and the first and the second data wire.

For example, the host communication circuit and the client communication circuit are specifically designed for audio applications, e.g. such that the host communication circuit is provided for an audio processing circuit with a digital signal processor for generating the audio data to be transmitted, and the client communication circuit is provided for some audio output circuit, e.g. with an amplifier for providing the received audio data to one or more speakers.

For example, the host communication circuit and the client communication circuit are implemented on separate dies. The dies may be integrated together in a single package or may be integrated in separate chip packages. For example, the dies are produced with different semiconductor technologies, e.g. on different wafer types.

An example implementation of a sound reproducing device according to the efficient communication concept comprises at least one speaker and a communication system according to one of the possible implementations described above. The at least one speaker is, for example, coupled to the client communication circuit. For example, the sound reproducing device is implemented as a headphone or earphone.

In some implementations, the sound reproducing device further comprises at least one noise cancellation microphone and a noise cancellation processor, wherein the noise cancellation processor is coupled to the noise cancellation microphone and to the host communication circuit.

In another aspect of the efficient communication concept, a communication method is provided for communication between a host side and a client side that are coupled by means of a clock wire, a selection wire and a first and a second data wire.

For example, the method comprises transmitting, from the host side, a digital selection signal over the selection wire to the client side, the selection signal determining either an audio transmission mode or a client communication mode; and transmitting digital audio data of a first channel and a second channel over the first and the second data wire from the host side to the client side in the audio transmission mode, and to perform client communication between the host side and the client side over the first and the second data wire in the client communication mode.

In some implementations, the method further comprises, when performing client communication in the client communication mode, transmitting a direction indicator from the host side to the client side; transmitting, from the host side to the client side over the first data wire, a first bit sequence, wherein, in the audio transmission mode, the first bit sequence comprises the audio data of the first channel, and, in the client communication mode, the first bit sequence comprises index data; in the audio transmission mode, transmitting a second bit sequence from the host side to the client side over the second data wire, wherein the second bit sequence comprises the audio data of the second channel; when performing client communication, if the direction indicator is associated with a write mode, transmitting a second bit sequence from the host side to the client side over the second data wire, wherein the second bit sequence comprises payload data; and, when performing client communication, if the direction indicator is associated with a read mode, transmitting a second bit sequence over the second data wire from the client side to the host side, wherein the second bit sequence comprises payload data. Optionally, the first bit sequence further comprises the direction indicator.

Further embodiments of the communication method become apparent for the skilled reader from the various embodiments described above for the host communication circuit, the client communication circuit and the communication system according to the efficient communication concept.

The efficient communication concept will be described in more detail below for several embodiments with reference to the drawings. Identical reference numerals designate signals, elements or components with identical functions. In so far as signals, elements or components correspond to one another in function, a description of them will not be repeated in each of the following figures.

DETAILED DESCRIPTION

Figure 1:
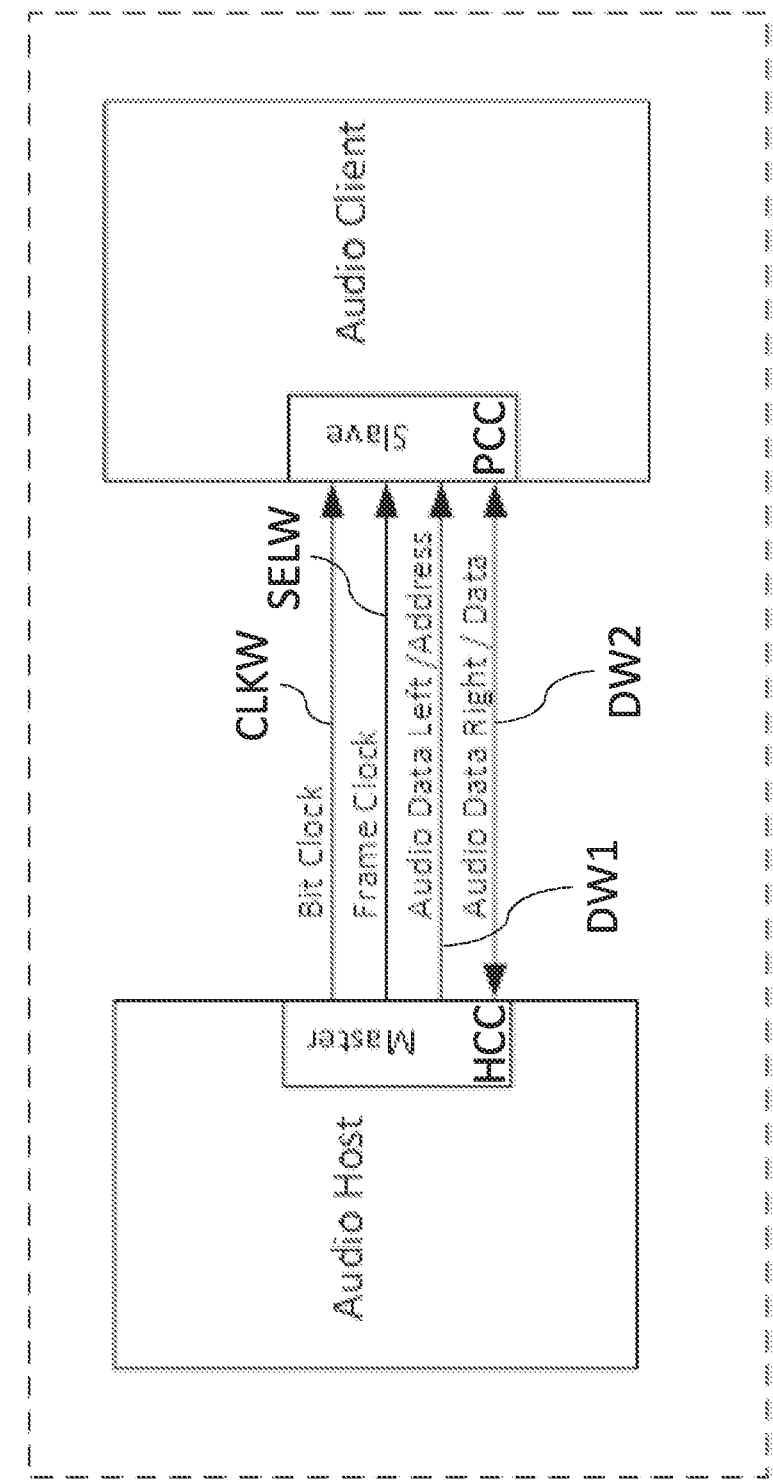
FIG. 1 shows an example block diagram of a connection between an audio host and an audio client according to the efficient communication concept.

FIG. 1 shows an example implementation of a connection between an audio host and an audio client, wherein the audio host includes a host communication circuit HCC acting as a master, and wherein the audio client includes a client communication circuit PCC acting as a slave, for example. The host communication circuit HCC and the client communication circuit PCC are connected with four wires, namely a clock wire CLKW, a selection wire SELW, a first data wire DW1 and a second data wire DW2. The arrows on the wires indicate the communication direction, for example.

For example, a clock signal is transmitted over the clock wire CLKW, e.g. acting as a bit clock. Over the selection wire SELW, a digital selection signal is transmitted that can also be called a frame clock. Both terms will be used in the following as synonyms. The first and the second data wire DW1, DW2 are used for transmitting bit sequences, which may correspond to audio data of a left and right channel, or to index or address data on the first data wire DW1 and payload data on the second data wire DW2.

The content of the respective bit sequences depends on a mode of operation that is determined by the selection signal or frame clock, respectively. In particular, a state or state change of the selection signal determines whether the communication system composed of the host communication circuit HCC and the client communication circuit PCC operates in an audio transmission mode or a client communication mode.

Figure 2:
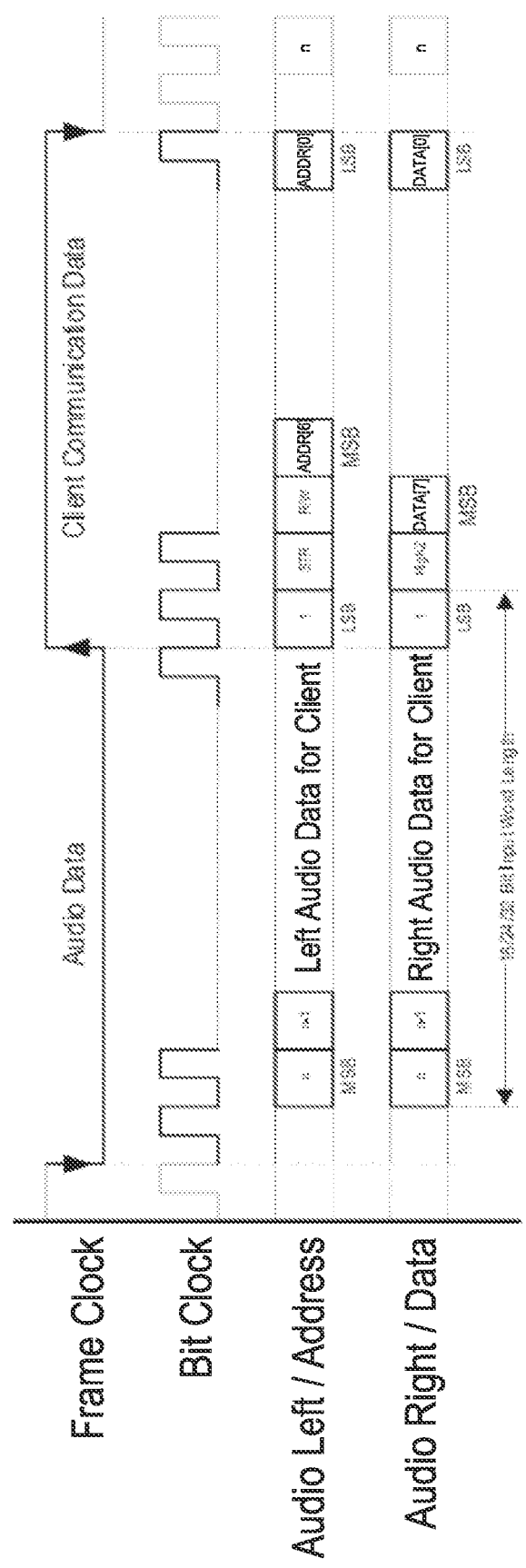
FIG. 2 shows an example signal diagram for a communication according to the efficient communication concept.

Referring now to FIG. 2, an example signal diagram for the communication over the four wires is shown. The frame clock or selection signal, which for example can take two different states, indicates an upcoming audio transmission mode by a change from the first, high state to the second, low state. Similarly, an upcoming client communication mode is indicated by a change of the selection signal from the second state to the first state. The association of high and low states to the first and second states could also be reversed, compared to the example above.

For example, the state changes of the selection signal are synchronized with clock edges of the clock signal or bit clock, respectively. Not all clock periods are shown for reasons of clarity. In the audio transmission mode, indicated by "Audio Data" in the diagram, a bit sequence with n bits is transmitted from the host communication circuit to the client communication circuit over the two data wires DW1, DW2, starting with most significant bit, MSB, and ending with the least significant bit, LSB. The word length of the bit sequence is chosen to be 16, 24 or 32 bit as an example, which however can be set fixedly or set automatically with a change of state of the selection signal.

As can be seen from the diagram, the transmission of the MSB starts one clock period after the state change of the selection signal. Similarly, the LSB is transmitted within the clock cycle immediately following the state change to the first state, indicating the upcoming client communication mode, indicated by "Client Communication Data" in the diagram. This may support better synchronization on the client side, for example. However, in other implementations, no delay after the state change of the selection signal may also be implemented, for example in order to establish a left justified transmission.

After transmission of the LSB, in the "Audio Left/Address" channel, associated with the first data wire DW1, a strobe bit or access indicator STR is transmitted indicating whether data on the first data wire DW1 and, if applicable, the second data wire DW2 are to be evaluated on the client side. Concurrently with the access indicator STR, the second data wire DW2 is set to a high impedance state, e.g. by connecting the second data wire DW2 to a high impedance connection in the host communication circuit. Alternatively, the second data wire DW2 could be set to any other state during that time, e.g. indicating a "Don't Care" state. The access indicator STR allows saving power on the client side, if no client communication is necessary. However, the access indicator STR is still optional and can be omitted depending on the desired implementation.

The access indicator STR is followed by a read or write bit or direction indicator R/W that indicates a write mode or a read mode to the client communication circuit. In the following, index data, e.g. in the form of a 7-bit read/write address, starting again with the most significant bit, are transmitted over the first data wire DW1. Other bit lengths than 7 could be used whenever it is appropriate.

On the second data wire DW2, in the "Audio Right/Data" channel, a bit sequence comprising payload data in the form of 8-bit read/write data is written to the second data wire DW2. Other bit lengths than 8 could be used whenever it is appropriate. For example, in the write mode, the host communication circuit transmits the payload data to the client communication circuit, and in the read mode, the client communication circuit transmits the payload data to the host communication circuit.

It should be noted that the access indicator STR and/or the direction indicator R/W can be left out in other implementations forms or, for example, transmitted over the second data wire DW2 instead. For example, the direction indicator R/W can be omitted in some applications, such that the write mode respectively read mode is predefined or set via a different communication channel.

FIGS. 3 to 6 relate to specific implementations of data transmission that are based on the basis representation of FIG. 2.

Figure 3:
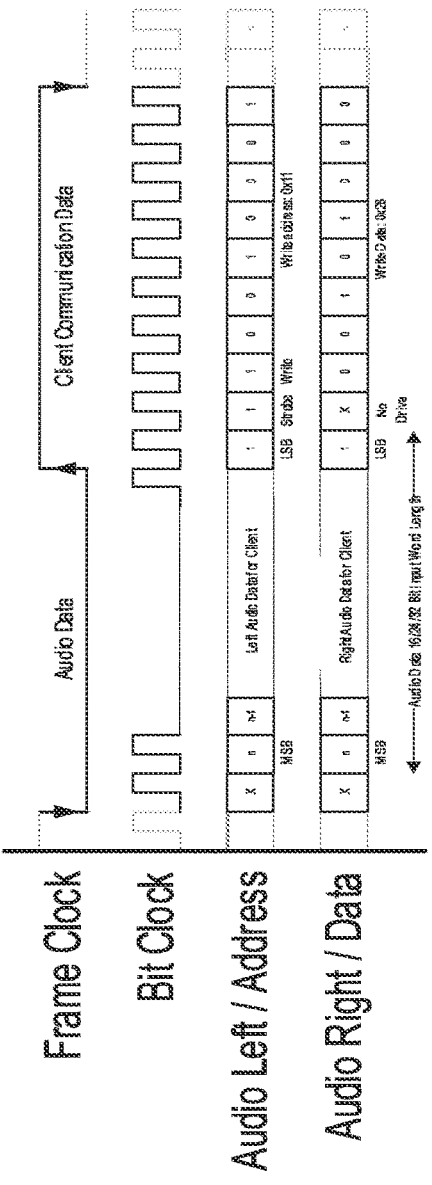
FIG. 3 shows an example signal diagram for audio data transmission and a write operation.

For example, FIG. 3 describes a communication sequence with transmission of audio data and a write operation. To this end, the strobe bit respectively access indicator STR is set to a high value, e.g. represented by a logical 1 as well as the direction indicator indicating the write process. On the first data wire DW1 associated with the "Audio Left/Address" channel, a write address of 11_hex (0x11) is transmitted to the client side. Concurrently, on the "Audio Right/Data" channel associated with the second data wire DW2, write data, respectively payload data 28_hex (0x28) are encoded as a bit sequence.

Figure 4:
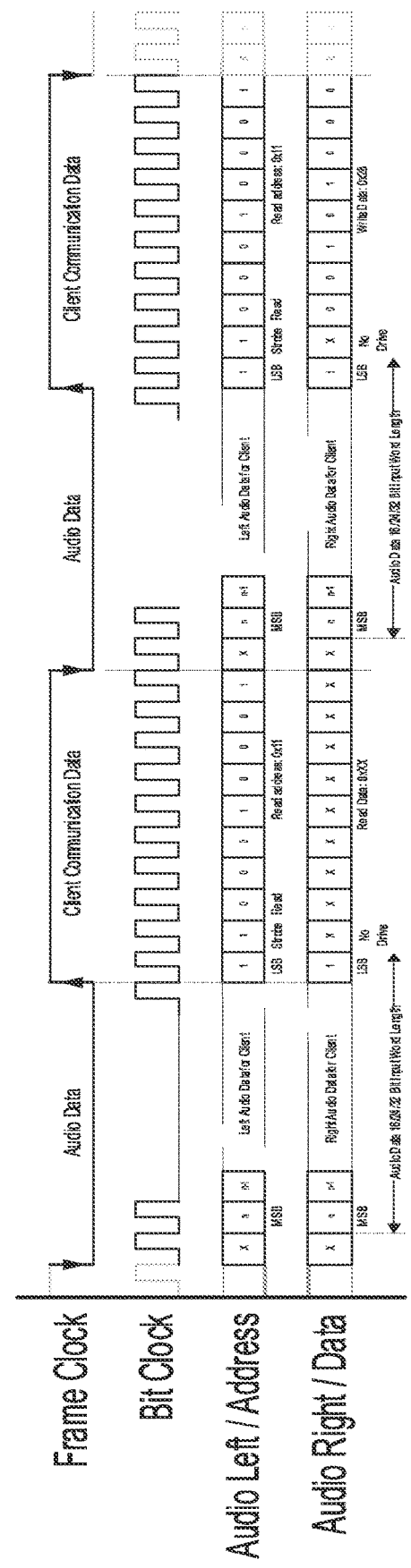
FIG. 4 shows an example signal diagram for audio data transmission and a read operation.

Referring now to FIG. 4, two cycles of the audio transmission mode and the client communication mode, respectively, are shown. For the audio transmission it is referred to the previous examples. FIG. 4 relates to a communication with a read operation. In the first cycle, the read address 11_hex (0x11) is transmitted over the first data wire DW1 while the second data wire is set to a high impedance state or to a don't care state. In the second cycle of the client communication mode, the read address is transmitted again. On the second data wire DW2, the client side transmits the payload 28_hex (0x28), which for example has been read out at the read address indicated in the first cycle.

In the second cycle of the client communication mode, instead of transmitting the read address again, another source address could be transmitted, which could be the basis for a readout in a following cycle of the client communication mode, not shown here.

Figure 5:
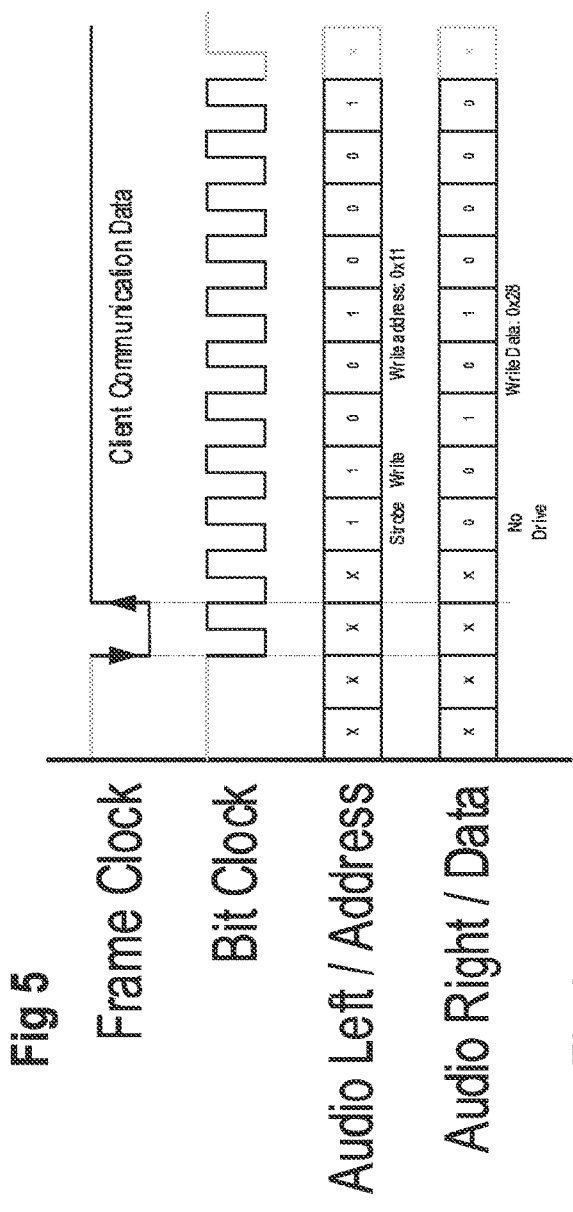
FIG. 5 shows an example signal diagram for a write operation without audio data transmission.
Figure 6:
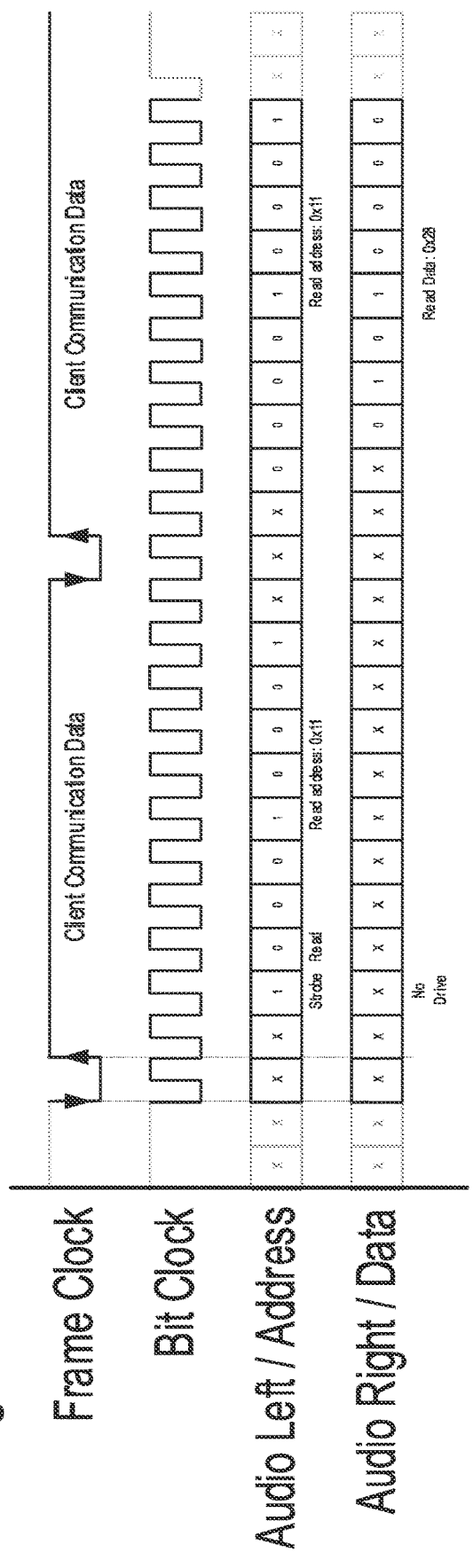
FIG. 6 shows an example signal diagram of a read operation without audio data transmission.

FIG. 5 and FIG. 6 correspond to a communication without audio transmission but otherwise corresponding to the client communication operation described for FIGS. 3 and 4. In particular, the client communication mode is used to transmit payload data 28_hex (0x28) to the write address 11_hex (0x11), as in the example of FIG. 3.

Similarly, the client communication described in conjunction with FIG. 6 corresponds to the read operation described in the example of FIG. 4.

Figure 7:
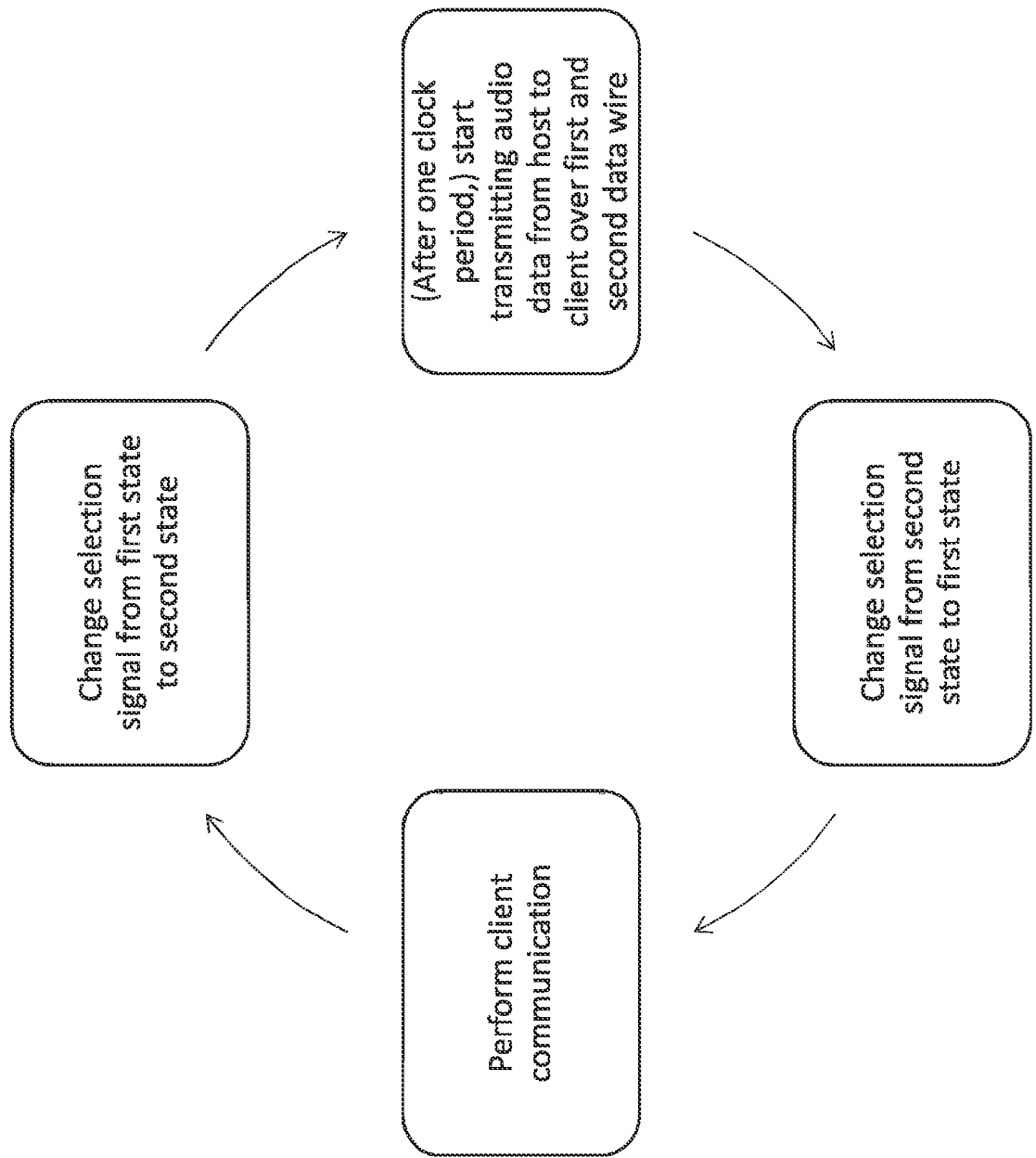
FIG. 7 shows an example flow diagram for data transmission with audio data.

FIG. 7 shows an example flow diagram for the communication in the communication system. For example, in order to indicate an upcoming audio transmission mode, the selection signal is changed from the first state to the second state. Then, after one clock period or, as an alternative, immediately, the host side starts transmitting audio data from the host side to the client side over the first and the second data wire, as described above in more detail. Then, the selection signal is changed from the second state to the first state in order to indicate the upcoming client communication mode. Then, the client communication is performed. Afterwards, the process can start again.

Figure 8:
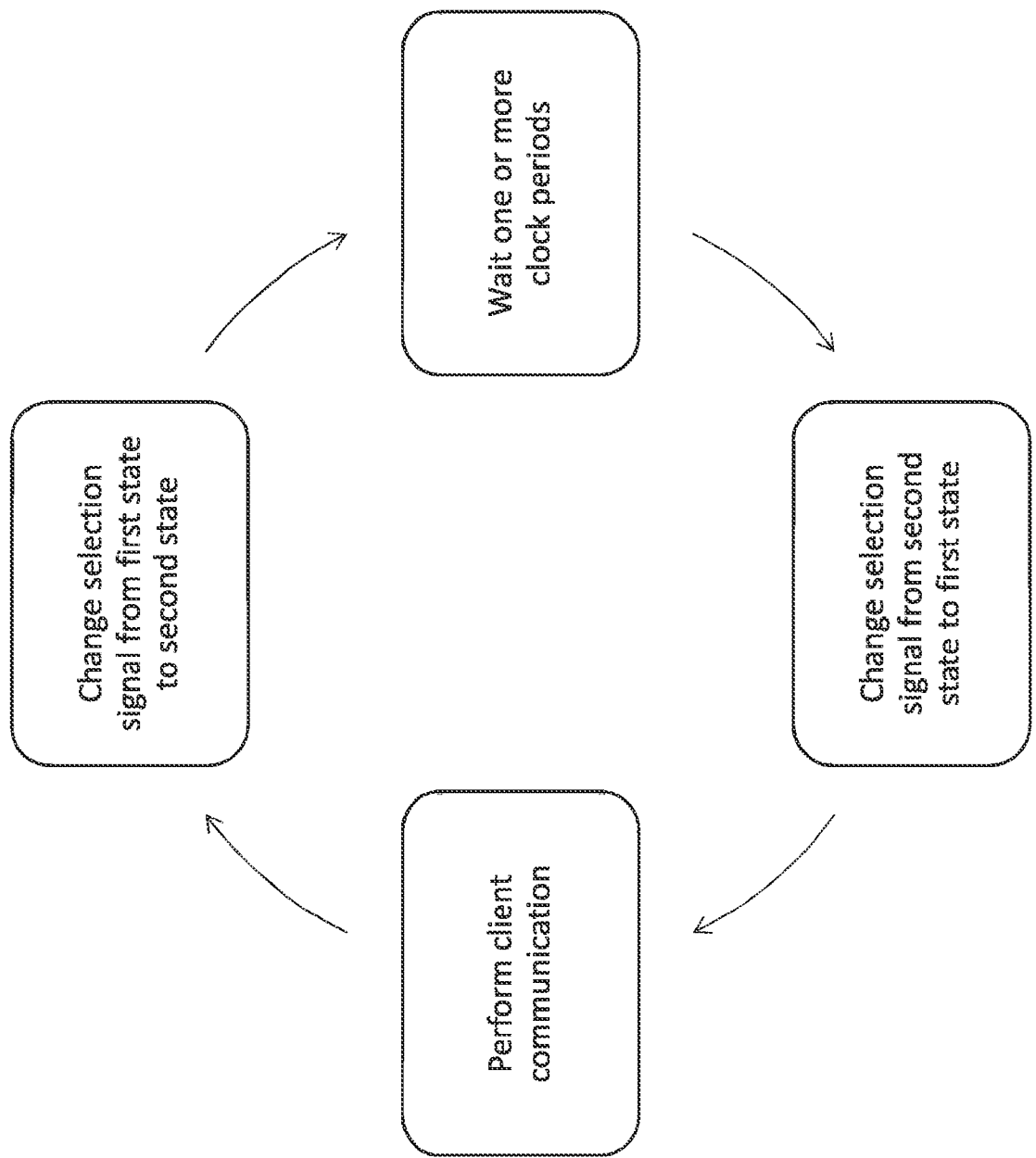
FIG. 8 shows an example flow diagram for data transmission without audio data.

FIG. 8 shows a further flow diagram that is based on the flow diagram of FIG. 7. In particular, FIG. 7 describes a communication in accordance with FIG. 3, FIG. 8 corresponds to the diagram of FIG. 5, where no audio data are transmitted and it is just waited for one or more clock periods of the bit clock.

Figure 9:
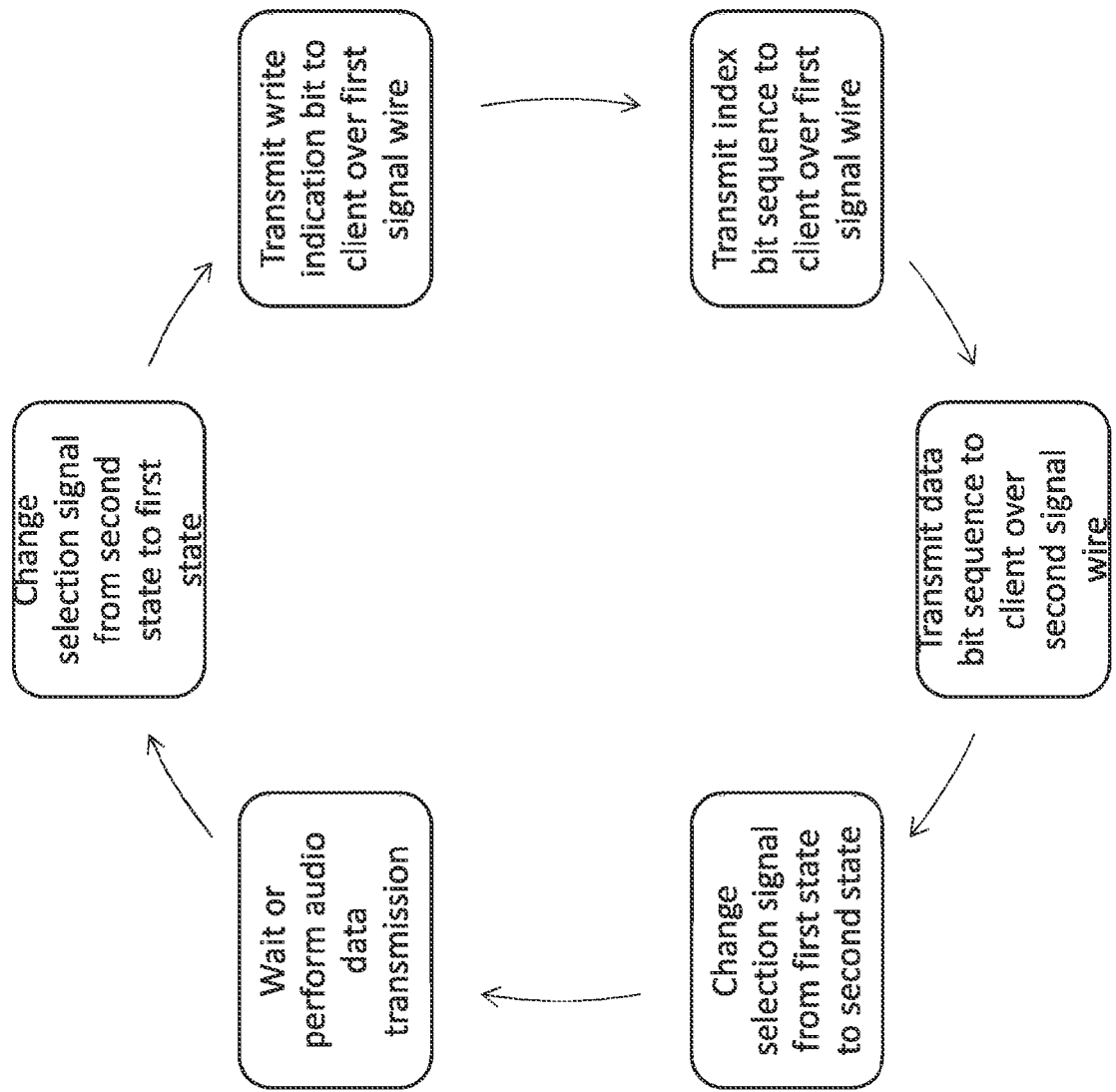
FIG. 9 shows an example flow diagram for data transmission with a write operation.

FIG. 9 shows a further flow diagram which corresponds to the signal diagrams of FIG. 3 or FIG. 5 where a write operation is performed. Starting from the top block, the selection signal is changed from the second state to the first state to indicate an upcoming client communication mode. Then the host side transmits a write indication bit to the client side over the first signal wire and transmits an index bit sequence corresponding to the write address to the client over the first signal wire. Concurrently with the previous two blocks, the host side transmits the data bit sequence or write data to the client side over the second signal wire. Afterwards, the selection signal is changed from the first state to the second state to indicate the audio transmission mode. In the following, audio data transmission is performed or it is waited for one or more clock periods, as described above.

Figure 10:
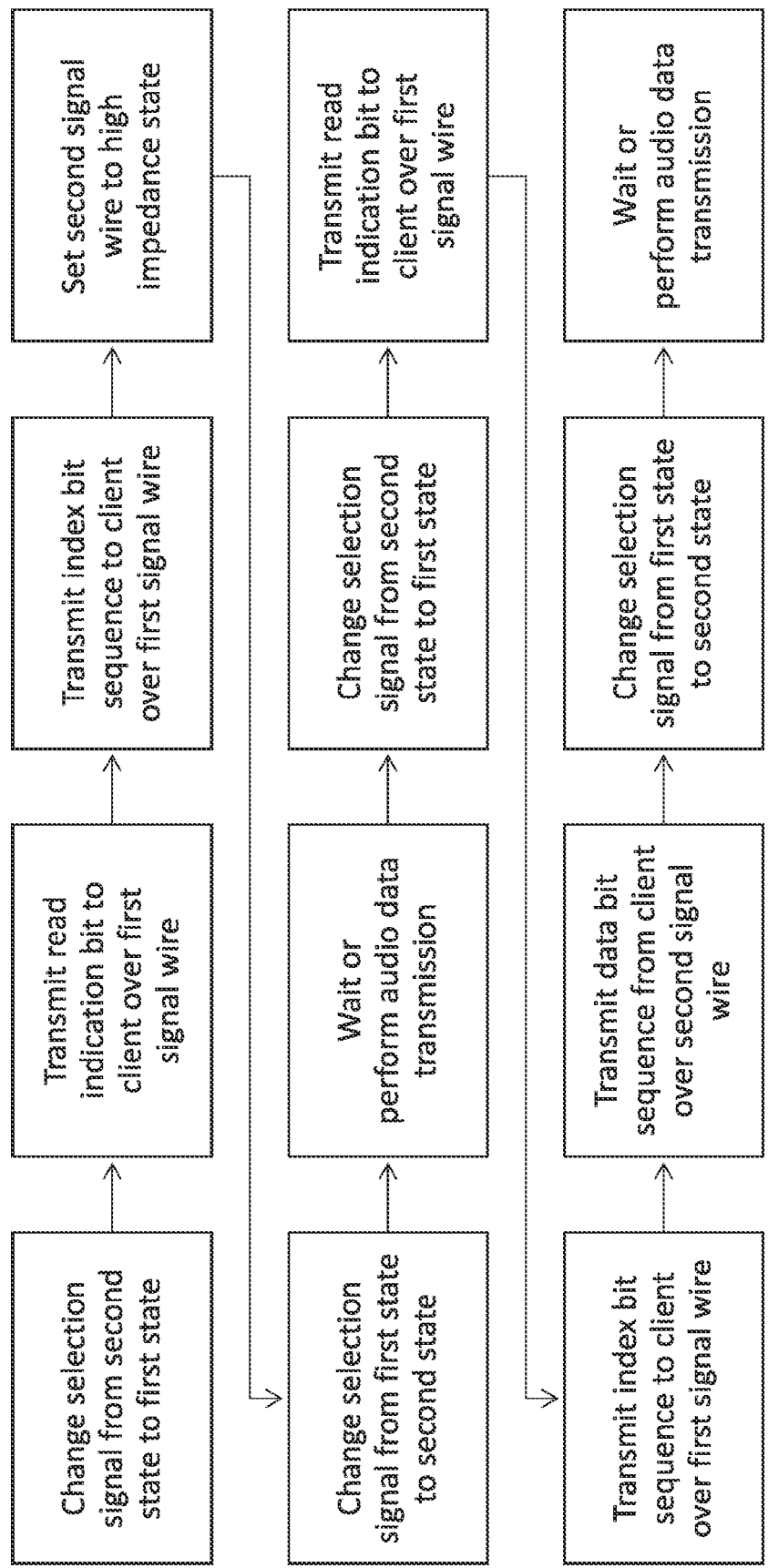
FIG. 10 shows an example flow diagram for data transmission with a read operation.

FIG. 10 shows a further flow diagram directed to a read operation instead of a write operation, and therefore corresponding to the signal diagrams of FIG. 4 or FIG. 6. In the first block, the selection signal is changed from the second state to the first state to indicate the upcoming client communication mode. The host side transmits the read indication bit to the client side over the first signal wire, followed by the index bit sequence to indicate the source or read address in the client. Referring to FIG. 4 or FIG. 6, during that time the second signal wire is set to a high impedance state or, alternatively, to a don't care state. Afterwards, the selection signal is changed from the first state to the second state to indicate an upcoming audio transmission mode. In the following, audio data transmission is performed or it is waited for one or more clock periods before changing the selection signal back from the second state to the first state to continue with the client communication mode.

Then, the read indication bit is transmitted to the client over the first signal wire followed by the index bit sequence. During that time, the client side transmits the payload data as a data bit sequence from the client to the host side over the second signal wire. After this, the selection signal changes from the first state to the second state, again to indicate the upcoming audio transmission mode. In this mode, again the audio data transmission can be performed or it can be waited for one or more clock periods. Then the process can start over, e.g. by continuing in the first block.

Figure 11:
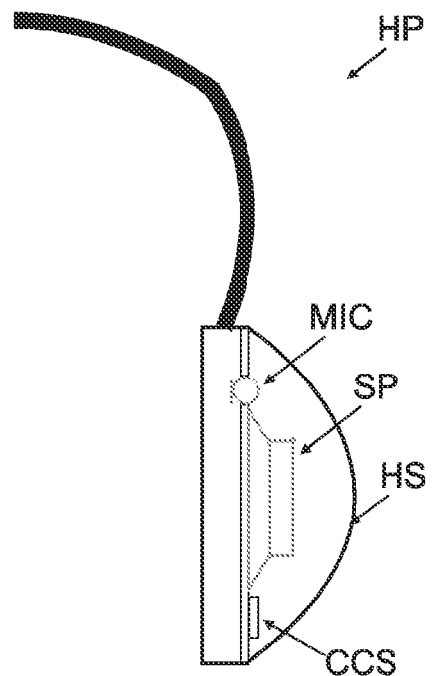
FIG. 11 shows an example implementation of a headphone.

The communication system comprising the host communication circuit and the client communication circuit can be used in a sound reproducing device like a headphone or earphone. FIG. 11 shows an example of such a headphone with a speaker and a communication system CCS which are both enclosed in a housing HS of the headphone HP. In this example, also a microphone MIC is provided acting as a noise cancellation microphone for performing noise cancellation. The speaker may be coupled to the client communication circuit PCC directly or via another circuit, e.g. a driver circuit or amplifier circuit, and the microphone may be coupled to a noise cancellation processor being integrated with the communication system CCS and connected to the host communication circuit HCC. In various implementations, the microphone MIC may be either a feedforward, FF, microphone or a feedback, FB, microphone, and a second microphone may also be foreseen to enable hybrid noise cancellation with both FF and FB.

Figure 12:
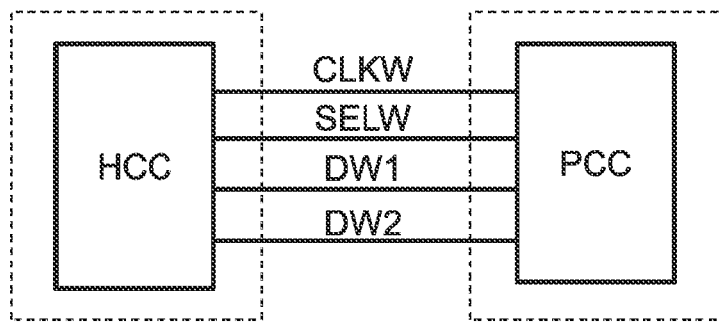
FIG. 12 shows an example implementation of a communication system.

FIG. 12 shows an example implementation where the host communication circuit HCC and the client communication circuit PCC are each implemented on separate dies which are integrated in separate chip packages.

Figure 13:
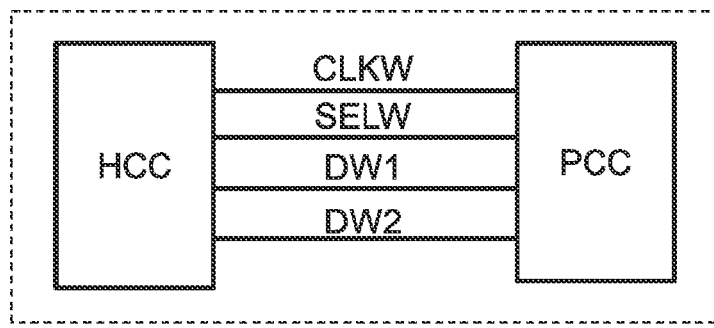
FIG. 13 shows a further example implementation of a communication system.

In contrast, in the implementation of FIG. 13, both the host communication circuit HCC and the client communication circuit PCC are integrated together in a single package.

In both implementations of FIG. 12 and FIG. 13, host and client are connected by the respective four wires, namely the clock wire CLKW, the selection wire SELW and the data wires DW1 and DW2.

In the following text, further aspects of the present disclosure are specified. The individual aspects are enumerated in order to facilitate the reference to features of other aspects.

1. A host communication circuit that is adapted to be connected to a client communication circuit by means of a clock wire, a selection wire, a first data wire and a second data wire, the host communication circuit being configured
   to transmit a digital selection signal over the selection wire to the client communication circuit, the selection signal determining either an audio transmission mode or a client communication mode; and
   to transmit digital audio data of a first channel and a second channel over the first and the second data wire to the client communication circuit in the audio transmission mode, and to perform client communication over the first and the second data wire in the client communication mode.

2. The host communication circuit according to aspect 1, wherein the host communication circuit is configured
   when performing client communication in the client communication mode, to transmit a direction indicator;
   to transmit a first bit sequence over the first data wire to the client communication circuit, wherein, in the audio transmission mode, the first bit sequence comprises the audio data of the first channel, and, when performing client communication, the first bit sequence comprises index data;
   in the audio transmission mode, to transmit a second bit sequence over the second data wire to the client communication circuit, wherein the second bit sequence comprises the audio data of the second channel;
   when performing client communication, if the direction indicator is associated with a write mode, to transmit a second bit sequence over the second data wire to the client communication circuit, wherein the second bit sequence comprises payload data; and
   when performing client communication, if the direction indicator is associated with a read mode, to receive a second bit sequence over the second data wire from the client communication circuit, wherein the second bit sequence comprises payload data.

3. The host communication circuit according to aspect 2, wherein, when performing client communication, the first bit sequence further comprises the direction indicator.

4. The host communication circuit according to aspect 3, wherein, in the client communication mode, the first bit sequence comprises the index data, the direction indicator and an access indicator, wherein a state of the access indicator determines, whether the first and, if applicable, the second bit sequence are evaluated in the client communication circuit.

5. The host communication circuit according to one of aspects 2 to 4, wherein, in the client communication mode, the index data determine a target, in particular a target address, in the client communication circuit in the write mode, and determine a source, in particular a source address, in the client communication circuit in the read mode.

6. The host communication circuit according to one of aspects 1 to 5, wherein the audio transmission mode and the client communication mode are determined by respective states or state changes of the selection signal.

7. The host communication circuit according to one of aspects 1 to 6, which is configured to indicate the audio transmission mode by changing the selection signal from a first state to a second state, and to indicate the client communication mode by changing the selection signal from the second state to the first state.

8. The host communication circuit according to one of aspects 1 to 7, which is configured to transmit the audio data of the first and the second channel concurrently or in parallel.

9. The host communication circuit according to one of aspects 1 to 8, which is configured to connect the first data wire and/or the second data wire to a high-impedance connection, if no bit information is to be transmitted, respectively.

10. The host communication circuit according to one of aspects 1 to 9, which is configured to transmit a clock signal over the clock wire to the client communication circuit.

11. The host communication circuit according to aspect 10, which is configured to, if no audio data are to be transmitted in the audio transmission mode, to change a state of the selection signal to indicate the client communication mode after one clock cycle of the clock signal.

12. The host communication circuit according to aspect 10, which is configured to, if no audio data are to be transmitted in the audio transmission mode, to change a state of the selection signal to indicate the client communication mode after a predetermined number of clock cycles of the clock signal, said number being smaller than a regular bit length of audio data to be transmitted.

13. A client communication circuit that is adapted to be connected to a host communication circuit by means of a clock wire, a selection wire, a first data wire and a second data wire, the client communication circuit being configured
  to receive a digital selection signal over the selection wire from the host communication circuit, the selection signal determining either an audio transmission mode or a client communication mode; and
  to receive digital audio data of a first channel and a second channel over the first and the second data wire from the host communication circuit in the audio transmission mode, and to perform client communication over the first and the second data wire in the client communication mode.

14. The client communication circuit according to aspect 13, wherein the client communication circuit is configured
  when performing client communication in the client communication mode, to receive a direction indicator;
  to receive a first bit sequence over the first data wire from the host communication circuit, wherein, in the audio transmission mode, the first bit sequence comprises the audio data of the first channel, and, when performing client communication, the first bit sequence comprises index data;
  in the audio transmission mode, to receive a second bit sequence over the second data wire from the host communication circuit, wherein the second bit sequence comprises the audio data of the second channel;
  when performing client communication, if the direction indicator is associated with a write mode, to receive a second bit sequence over the second data wire from the host communication circuit, wherein the second bit sequence comprises payload data; and
  when performing client communication, if the direction indicator is associated with a read mode, to transmit a second bit sequence over the second data wire to the host communication circuit, wherein the second bit sequence comprises payload data.

15. The client communication circuit according to aspect 14, wherein, when performing client communication, the first bit sequence further comprises the direction indicator.

16. The client communication circuit according to aspect 15, wherein, in the client communication mode, the first bit sequence comprises the index data, the direction indicator and an access indicator, wherein a state of the access indicator determines, whether the first and, if applicable, the second bit sequence are evaluated in the client communication circuit.

17. The client communication circuit according to one of aspects 14 to 16, wherein, in the client communication mode, the index data determine a target, in particular a target address, in the client communication circuit in the write mode, and determine a source, in particular a source address, in the client communication circuit in the read mode.

18. The client communication circuit according to one of aspects 13 to 17, wherein the audio transmission mode and the client communication mode are determined by respective states or state changes of the selection signal.

19. The client communication circuit according to one of aspects 13 to 18, wherein the audio transmission mode is indicated by the selection signal changing from a first state to a second state, and the client communication mode is indicated by the selection signal changing from the second state to the first state.

20. The client communication circuit according to one of aspects 13 to 19, which is configured to receive the audio data of the first and the second channel concurrently or in parallel.

21. The client communication circuit according to one of aspects 13 to 20, which is configured to receive a clock signal over the clock wire from the host communication circuit.

22. A communication system with a host communication circuit according to one of aspects 1 to 12 and a client communication circuit according to one of aspects 13 to 21, which are connected to each other by means of the clock wire, the selection wire, the first data wire and the second data wire.

23. The communication system according to aspect 22, wherein the host communication circuit and the client communication circuit are implemented on separate dies.

24. The communication system according to aspect 23, wherein the dies are integrated together in a single package.

25. The communication system according to aspect 23, wherein the dies are integrated in separate chip packages.

26. A sound reproducing device comprising at least one speaker and a communication system according to one of aspects 22 to 25, wherein the at least one speaker is coupled to the client communication circuit.

27. The sound reproducing device according to aspect 26, which is implemented as a headphone or earphone.

28. The sound reproducing device according to aspect 26 or 27, which further comprises at least one noise cancellation microphone and a noise cancellation processor, wherein the noise cancellation processor is coupled to the noise cancellation microphone and to the host communication circuit.

29. A communication method for communication between a host side and a client side that are coupled by means of a clock wire, a selection wire, a first data wire and a second data wire, the method comprising
    transmitting, from the host side, a digital selection signal over the selection wire to the client side, the selection signal determining either an audio transmission mode or a client communication mode; and
    transmitting digital audio data of a first channel and a second channel over the first and the second data wire from the host side to the client side in the audio transmission mode, and to perform client communication between the host side and the client side over the first and the second data wire in the client communication mode.

30. The method according to aspect 29, wherein
    when performing client communication in the client communication mode, transmitting a direction indicator from the host side to the client side;
    transmitting, from the host side to the client side over the first data wire, a first bit sequence, wherein, in the audio transmission mode, the first bit sequence comprises the audio data of the first channel, and, in the client communication mode, the first bit sequence comprises index data;
    in the audio transmission mode, transmitting a second bit sequence from the host side to the client side over the second data wire, wherein the second bit sequence comprises the audio data of the second channel;
    when performing client communication, if the direction indicator is associated with a write mode, transmitting a second bit sequence from the host side to the client side over the second data wire, wherein the second bit sequence comprises payload data; and
    when performing client communication, if the direction indicator is associated with a read mode, transmitting a second bit sequence over the second data wire from the client side to the host side, wherein the second bit sequence comprises payload data.

31. The method according to aspect 30, wherein, when performing client communication, the first bit sequence further comprises the direction indicator.

32. The method according to aspect 31, wherein, in the client communication mode, the first bit sequence comprises the index data, the direction indicator and an access indicator, wherein a state of the access indicator determines, whether the first and, if applicable, the second bit sequence are evaluated on the client side.

33. The method according to one of aspects 30 to 32, wherein, in the client communication mode, the index data determine a target, in particular a target address, on the client side in the write mode, and determine a source, in particular a source address, on the client side in the read mode.

34. The method according to one of aspects 29 to 33, wherein the audio transmission mode and the client communication mode are determined by respective states or state changes of the selection signal.

35. The method according to one of aspects 29 to 34, wherein the audio transmission mode is indicated by the selection signal changing from a first state to a second state, and the client communication mode is indicated by the selection signal changing from the second state to the first state.

36. The method according to one of aspects 29 to 35, wherein the audio data of the first and the second channel are transmitted concurrently or in parallel.

37. The method according to one of aspects 29 to 36, wherein the host side connects the first data wire and/or the second data wire to a high-impedance connection, if no bit information is to be transmitted, respectively.

38. The method according to one of aspects 29 to 37, wherein a clock signal is transmitted over the clock wire from the host side to the client side.

39. The method according to aspect 38, wherein, if no audio data are to be transmitted in the audio transmission mode, a state of the selection signal is changed to indicate the client communication mode after one clock cycle of the clock signal.

40. The method according to aspect 38, wherein, if no audio data are to be transmitted in the audio transmission mode, a state of the selection signal is changed to indicate the client communication mode after a predetermined number of clock cycles of the clock signal, said number being smaller than a regular bit length of audio data to be transmitted.

The invention claimed is:

1. A host communication circuit that is adapted to be connected to a client communication circuit by means of a clock wire, a selection wire, a first data wire and a second data wire, the host communication circuit being configured
    to transmit a digital selection signal over the selection wire to the client communication circuit, the selection signal determining either an audio transmission mode or a client communication mode; and
    to transmit digital audio data of a first channel and a second channel over the first and the second data wire to the client communication circuit in the audio transmission mode, and to perform bidirectional client communication over the first and the second data wire in the client communication mode.

2. The host communication circuit according to claim 1, wherein the host communication circuit is configured
    when performing client communication in the client communication mode, to transmit a direction indicator;
    to transmit a first bit sequence over the first data wire to the client communication circuit, wherein, in the audio transmission mode, the first bit sequence comprises the audio data of the first channel, and, when performing client communication, the first bit sequence comprises index data;
    in the audio transmission mode, to transmit a second bit sequence over the second data wire to the client communication circuit, wherein the second bit sequence comprises the audio data of the second channel;
    when performing client communication, if the direction indicator is associated with a write mode, to transmit a second bit sequence over the second data wire to the client communication circuit, wherein the second bit sequence comprises payload data; and
    when performing client communication, if the direction indicator is associated with a read mode, to receive a second bit sequence over the second data wire from the client communication circuit, wherein the second bit sequence comprises payload data.

3. The host communication circuit according to claim 2, wherein, when performing client communication, the first bit sequence further comprises the direction indicator.

4. The host communication circuit according to claim 3, wherein, in the client communication mode, the first bit sequence comprises the index data, the direction indicator and an access indicator, wherein a state of the access indicator determines, whether the first and, if applicable, the second bit sequence are evaluated in the client communication circuit.

5. The host communication circuit according to claim 2, wherein, in the client communication mode, the index data determine a target, in particular a target address, in the client communication circuit in the write mode, and determine a source, in particular a source address, in the client communication circuit in the read mode.

6. The host communication circuit according to claim 1, wherein the audio transmission mode and the client communication mode are determined by respective states or state changes of the selection signal.

7. The host communication circuit according to claim 1, which is configured to transmit a clock signal over the clock wire to the client communication circuit.

8. A client communication circuit that is adapted to be connected to a host communication circuit by means of a clock wire, a selection wire, a first data wire and a second data wire, the client communication circuit being configured
   to receive a digital selection signal over the selection wire from the host communication circuit, the selection signal determining either an audio transmission mode or a client communication mode; and
   to receive digital audio data of a first channel and a second channel over the first and the second data wire from the host communication circuit in the audio transmission mode, and to perform bidirectional client communication over the first and the second data wire in the client communication mode.

9. The client communication circuit according to claim 8, wherein the client communication circuit is configured
   when performing client communication in the client communication mode, to receive a direction indicator;
   to receive a first bit sequence over the first data wire from the host communication circuit, wherein, in the audio transmission mode, the first bit sequence comprises the audio data of the first channel, and, when performing client communication, the first bit sequence comprises index data;
   in the audio transmission mode, to receive a second bit sequence over the second data wire from the host communication circuit, wherein the second bit sequence comprises the audio data of the second channel;
   when performing client communication, if the direction indicator is associated with a write mode, to receive a second bit sequence over the second data wire from the host communication circuit, wherein the second bit sequence comprises payload data; and
   when performing client communication, if the direction indicator is associated with a read mode, to transmit a second bit sequence over the second data wire to the host communication circuit, wherein the second bit sequence comprises payload data.

10. A communication system comprising a host communication circuit according to claim 1 and a client communication circuit connected to the host communication circuit by a clock wire, a selection wire, a first data wire and a second data wire, the client communication circuit configured
    to receive a digital selection signal over the selection wire from the host communication circuit, the selection signal determining either an audio transmission mode or a client communication mode; and
    to receive digital audio data of a first channel and a second channel over the first and the second data wire from the host communication circuit in the audio transmission mode, and to perform bidirectional client communication over the first and the second data wire in the client communication mode.

11. The communication system according to claim 10, wherein the host communication circuit and the client communication circuit are implemented on separate dies.

12. The communication system according to claim 11, wherein the dies are integrated either
    together in a single package; or
    in separate chip packages.

13. A sound reproducing device, in particular a headphone or earphone, comprising at least one speaker and a communication system according to claim 10 wherein the at least one speaker is coupled to the client communication circuit.

14. A communication method for communication between a host side and a client side that are coupled by means of a clock wire, a selection wire, a first data wire and a second data wire, the method comprising
    transmitting, from the host side, a digital selection signal over the selection wire to the client side, the selection signal determining either an audio transmission mode or a client communication mode; and
    transmitting digital audio data of a first channel and a second channel over the first and the second data wire from the host side to the client side in the audio transmission mode, and to perform bidirectional client communication between the host side and the client side over the first and the second data wire in the client communication mode.

15. The method according to claim 14, wherein
    when performing client communication in the client communication mode, transmitting a direction indicator from the host side to the client side;
    transmitting, from the host side to the client side over the first data wire, a first bit sequence, wherein, in the audio transmission mode, the first bit sequence comprises the audio data of the first channel, and, in the client communication mode, the first bit sequence comprises index data;
    in the audio transmission mode, transmitting a second bit sequence from the host side to the client side over the second data wire, wherein the second bit sequence comprises the audio data of the second channel;
    when performing client communication, if the direction indicator is associated with a write mode, transmitting a second bit sequence from the host side to the client side over the second data wire, wherein the second bit sequence comprises payload data; and
    when performing client communication, if the direction indicator is associated with a read mode, transmitting a second bit sequence over the second data wire from the client side to the host side, wherein the second bit sequence comprises payload data.

* * * * *